United States Patent
Lin et al.

(10) Patent No.: US 10,630,935 B2
(45) Date of Patent: Apr. 21, 2020

(54) METHOD FOR ADJUSTING AN ASPECT RATIO OF A DISPLAYED IMAGE AND DISPLAY SYSTEM THEREOF

(71) Applicant: BENQ CORPORATION, Taipei (TW)

(72) Inventors: Hsin-Nan Lin, Taipei (TW); Chung-Yu Huang, Taipei (TW)

(73) Assignee: BENQ CORPORATION, Taipei (TW)

( * ) Notice: Subject to any disclaimer, the term of this patent is extended or adjusted under 35 U.S.C. 154(b) by 0 days.

(21) Appl. No.: 16/053,795

(22) Filed: Aug. 3, 2018

(65) Prior Publication Data

US 2019/0104279 A1    Apr. 4, 2019

(30) Foreign Application Priority Data

Sep. 30, 2017  (CN) .......................... 2017 1 0915262

(51) Int. Cl.
*H04N 7/01* (2006.01)
*G09G 3/34* (2006.01)
*G09G 3/32* (2016.01)

(52) U.S. Cl.
CPC ............ *H04N 7/0122* (2013.01); *G09G 3/32* (2013.01); *G09G 3/3426* (2013.01); *G09G 2320/0233* (2013.01); *G09G 2320/0252* (2013.01)

(58) Field of Classification Search
CPC ...... H04N 7/0122; G09G 3/32; G09G 3/3426; G09G 2320/0233; G09G 2320/0252
See application file for complete search history.

(56) References Cited

U.S. PATENT DOCUMENTS

| | | | |
|---|---|---|---|
| 6,903,716 B2 * | 6/2005 | Kawabe | G09G 3/342 345/100 |
| 8,085,238 B2 * | 12/2011 | Misonou | G09G 3/342 315/169.3 |
| 10,262,610 B2 * | 4/2019 | Lee | G09G 3/342 |
| 2011/0037784 A1 | 2/2011 | Shiomi | |
| 2016/0086585 A1 | 3/2016 | Sugimoto | |

FOREIGN PATENT DOCUMENTS

| | | |
|---|---|---|
| CN | 102822728 B | 7/2015 |
| EP | 3 086 223 A1 | 10/2016 |
| TW | 201111972 A1 | 4/2011 |

* cited by examiner

*Primary Examiner* — Michael E Teitelbaum
(74) *Attorney, Agent, or Firm* — Winston Hsu

(57) ABSTRACT

A method for adjusting the aspect ratio of a displayed image includes setting a first displayed image range, selectively adjusting the size of the first displayed image range to generate a second displayed image range, driving a plurality of pixels inside the second displayed image range of a display panel to display an image, and disabling a plurality of pixels outside the second displayed image range of the display panel.

18 Claims, 9 Drawing Sheets

METHOD FOR ADJUSTING AN ASPECT RATIO OF A DISPLAYED IMAGE AND DISPLAY SYSTEM THEREOF

BACKGROUND OF THE INVENTION

1. Field of the Invention

The present invention illustrates a method and a display system for adjusting an aspect ratio of a displayed image, and more particularly, a method and a display system for adjusting the aspect ratio of the displayed image by using information of coordinates.

2. Description of the Prior Art

With rapid advancement of technologies, various powerful processing devices are integrated into the displays for providing audio/video entertainments and satisfactory visual experiences. Since a user has a specific visual preference, a capability of adjusting an aspect ratio of a displayed image is required by the display. For example, a screen size supported by the display can be 27 inches with an aspect ratio equal to 16:9. When the aspect ratio is adjusted, the display has to buffer video data or images to a frame buffer memory by using an internal processor, and then performs a scaling process. As a result, an image timing delay usually occurs.

In other words, for a conventional display capable of adjusting an aspect ratio of the displayed image, when a user watches a video stream (for example, a movie), if the user adjusts the aspect ratio of the displayed image, the video stream information may be delayed or asynchronous. For example, adjusting the aspect ratio of the displayed image may cause a few seconds delay of the video stream information. Delay time of the video stream depends on a resolution of the display image. However, the delay of the video stream reduces the user's visual experience and causes visual fatigue.

SUMMARY OF THE INVENTION

In an embodiment of the present invention, a method for adjusting an aspect ratio of a displayed image is disclosed. The method comprises setting a first displayed image range, generating a second displayed image range of a display panel according to the first displayed image range, driving a plurality of pixels inside the second displayed image range of the display panel for displaying an image, and disabling a plurality of pixels outside the second displayed image range of the display panel.

In another embodiment of the present invention, a display system for adjusting an aspect ratio of a displayed image is disclosed. The display system comprises a display panel, a gate driving circuit, a data driving circuit, a logical board, a backlight driving circuit, and a chip processor. The display panel comprises a plurality of pixels configured to display an image. The gate driving circuit is coupled to the plurality of pixels. The data driving circuit is coupled to the plurality of pixels. The logical board is coupled to the gate driving circuit and the data driving circuit and configured to control the gate driving circuit and the data driving circuit. The backlight driving circuit is configured to control a plurality of backlight components. The chip processor is coupled to the logical board and the backlight driving circuit and configured to control the logical board and the backlight driving circuit. After the chip processor receives a signal corresponding to a first displayed image range, the chip processor generates a second displayed image range of a display panel according to the first displayed image range. The gate driving circuit and the data driving circuit drive a plurality of pixels inside the second displayed image range of the display panel for displaying the image, and disable a plurality of pixels outside the second displayed image range.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
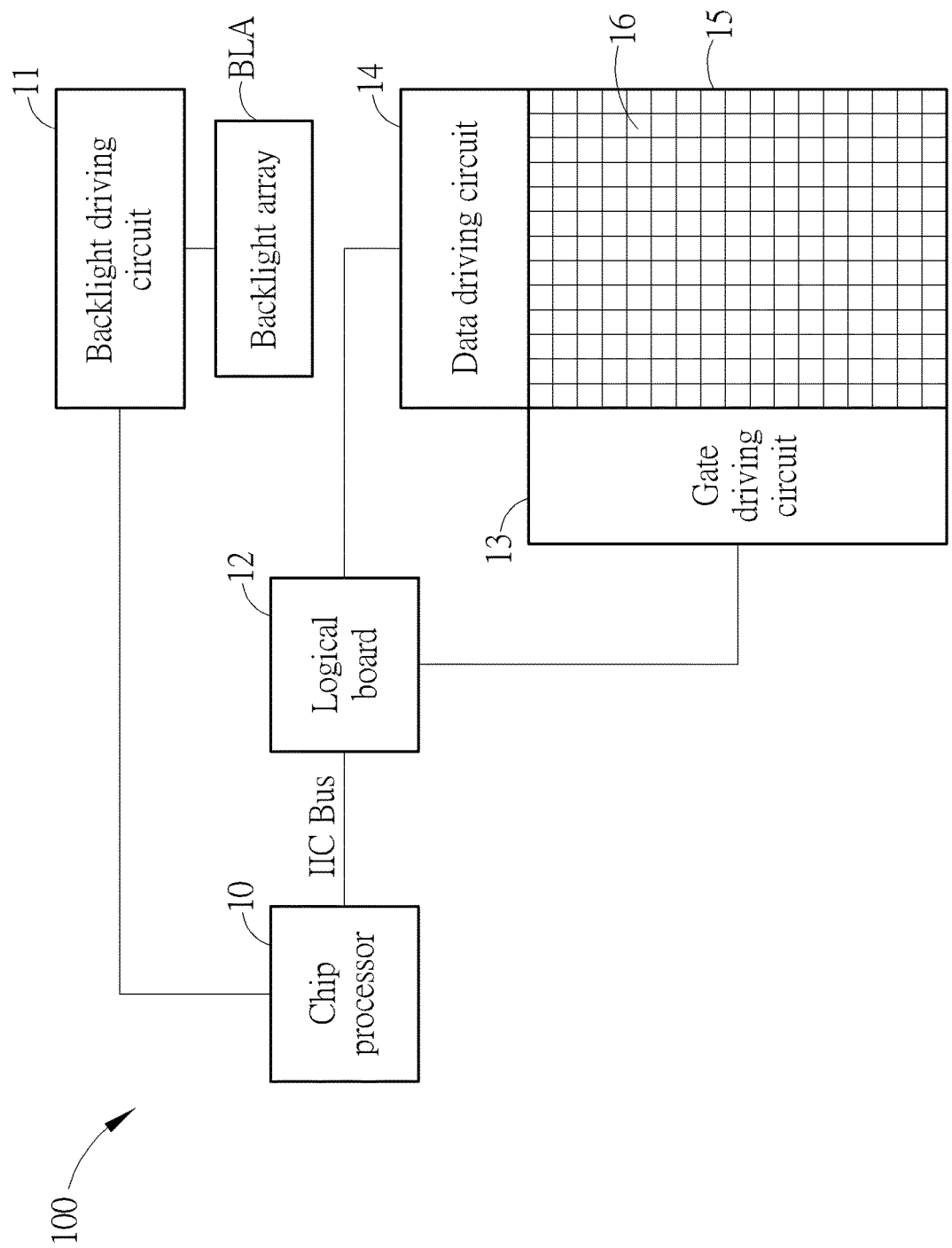
FIG. 1 is a block diagram of a display system according to an embodiment of the present invention.

FIG. 1 is a block diagram of a display system 100 according to an embodiment of the present invention. The display system 100 includes a display panel 15, a gate driving circuit 13, a data driving circuit 14, a logical board 12, a backlight driving circuit 11, a backlight array BLA, and a chip processor 10. The display panel 15 includes a plurality of pixels 16 for displaying an image. The plurality of pixels 16 can be allocated in the form of an array structure. The gate driving circuit 13 is coupled to the plurality of pixels 16. The gate driving circuit 13 can be used for controlling control terminals of the plurality of pixels 16. The data driving circuit 14 can be used for controlling driving operations of the plurality of pixels 16 in order to display the image with various gray levels and color tones. The logical board 12 (i.e., a T-CON board) is coupled to the gate driving circuit 13 and the data driving circuit 14 for controlling the gate driving circuit 13 and the data driving circuit 14. For example, the logical board 12 can be a core circuit for controlling timing pulse sequences of clock signals of the display panel 15. Thus, the logical board 12 can control scanning time of the plurality of pixels 16 through the gate driving circuit 13 and the data driving circuit 14. The logical board 12 can also be used for converting an inputted video signal (i.e., for example, a Low-voltage differential signal, LVDS) to a signal utilized by a driving digital circuit with a standard format (i.e., for example, a reduced swing differential signal, RSDS). The backlight driving circuit 11 is coupled to the backlight array BLA for controlling a plurality of backlight components (i.e., a plurality of backlight components BLC in FIG. 4) of the backlight array BLA. The chip processor 10 is coupled to the logical board 12 and the backlight driving circuit 11 for controlling the logical board 12 and the backlight driving circuit 11. The chip processor 10 can be any programmable chip or any type of processor. For example, the chip processor 10 can be a scalar inside the display system 100, or a micro-processor capable of programming commands. The chip processor 10 can save and configure a plurality of timing parameters. Further, data communications between the chip processor 10 and the logical board 12 can be performed through an inter-integrated circuit ($I^2C$) bus.

In the display system 100, the display panel 15 is capable of performing an "on screen display (OSD)" function. The OSD function can provide an interface to a user for setting image configurations. After the user sets a first displayed image range through the display panel 15, the display panel 15 can generate a signal corresponding to the first displayed image range to the chip processor 10. After the chip processor 10 receives the signal corresponding to the first displayed image range, the chip processor 10 can generate a signal corresponding to a second displayed image range of the display panel 15 according to the first displayed image range. Here, the signal corresponding to the second displayed image range is relevant to the signal corresponding to the first displayed image range. For example, the first displayed image range and the second displayed image range are substantially equal. In the display system 100, the chip processor 10 can be used for adjusting the first displayed image range to the second displayed image range according to allocations of grid lines of the backlight components in the backlight array BLA driven by the backlight driving circuit 11. An adjusting method is illustrated later. In the following, the chip processor 10 can drive the display panel 15 through the logical board 12, the gate driving circuit 13, and the data driving circuit 14 for displaying the image by enabling a plurality of pixels 16 within the second displayed image range. Further, the processor 10 can adjust at least one clock signal used for displaying the image according to the second displayed image range. For example, the processor 10 can proportionally adjust timing windows or pulse widths of a horizontal clock signal and/or vertical clock signal. Further, the processor 10 can disable a plurality of pixels 16 outside the second displayed image range of the display panel 15. A method for adjusting the aspect ratio of the displayed image is illustrated below.

Figure 2:
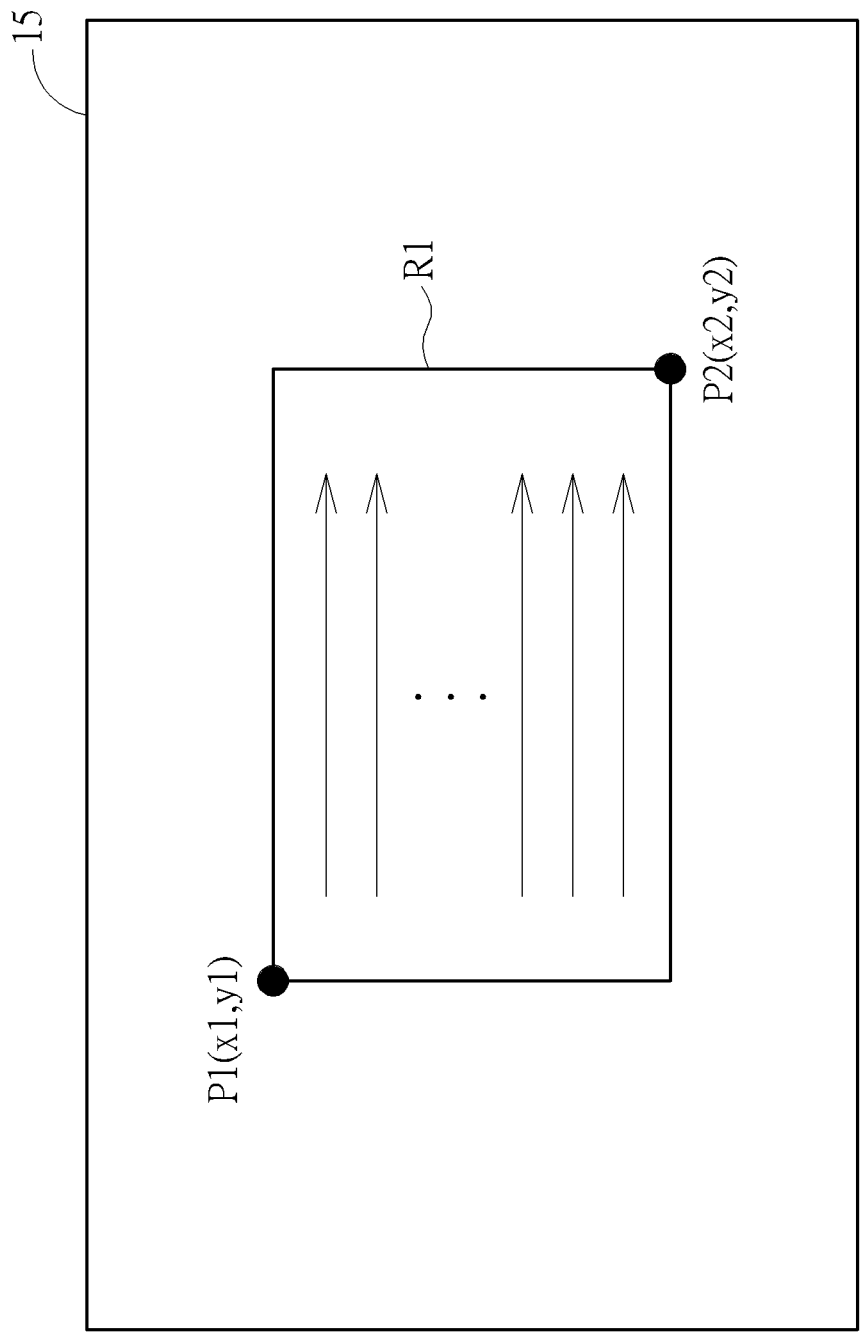
FIG. 2 is an illustration of setting a first displayed image range initially of the display system in FIG. 1.

FIG. 2 is an illustration of setting a first displayed image range R1 of the display system 100. The first displayed image range R1 can be a range defined by the user or a range predetermined by the display system 100. For example, the first displayed image range R1 can be 17 inches with an aspect ratio equal to 16:9. Further, a center of the first displayed image range R1 can be a center of the display panel 15. However, the center of the first displayed image range R1 can be adjusted arbitrarily. For example, a user can adjust a vertical offset of the first displayed image range R1 while a center horizontal line of the first displayed image range R1 is aligned to a horizontal line of the center position. Similarly, the user can adjust a horizontal offset of the first displayed image range R1 while a center vertical line of the first displayed image range R1 is aligned to a vertical line of the center position. Also, the user can adjust both the horizontal offset and the vertical offset of the first displayed image range R1. Further, the user can adjust center points of the first displayed image range R1 and the second displayed image range R2 (i.e., as illustrated later) by using the OSD function of the display panel 15. When the first displayed image range R1 is determined, the chip processor 10 can generate first coordinates P1 and second coordinates P2 corresponding to the first displayed image range R1. In FIG. 2, the first coordinates P1 and the second coordinates P2 are of diagonally opposite corners of the first displayed image range R1. The first coordinates P1 are denoted as (x1,y1). The second coordinates P2 are denoted as (x2,y2). However, the first displayed image range R1 is not limited to a rectangular shape. In other words, the user can set a specific shape of a range for displaying the image on of the display panel 15. In the embodiment, the first displayed image range R1 is of a rectangular shape. However, a displayed image range of the present invention is not limited to the rectangular shape.

Figure 3:
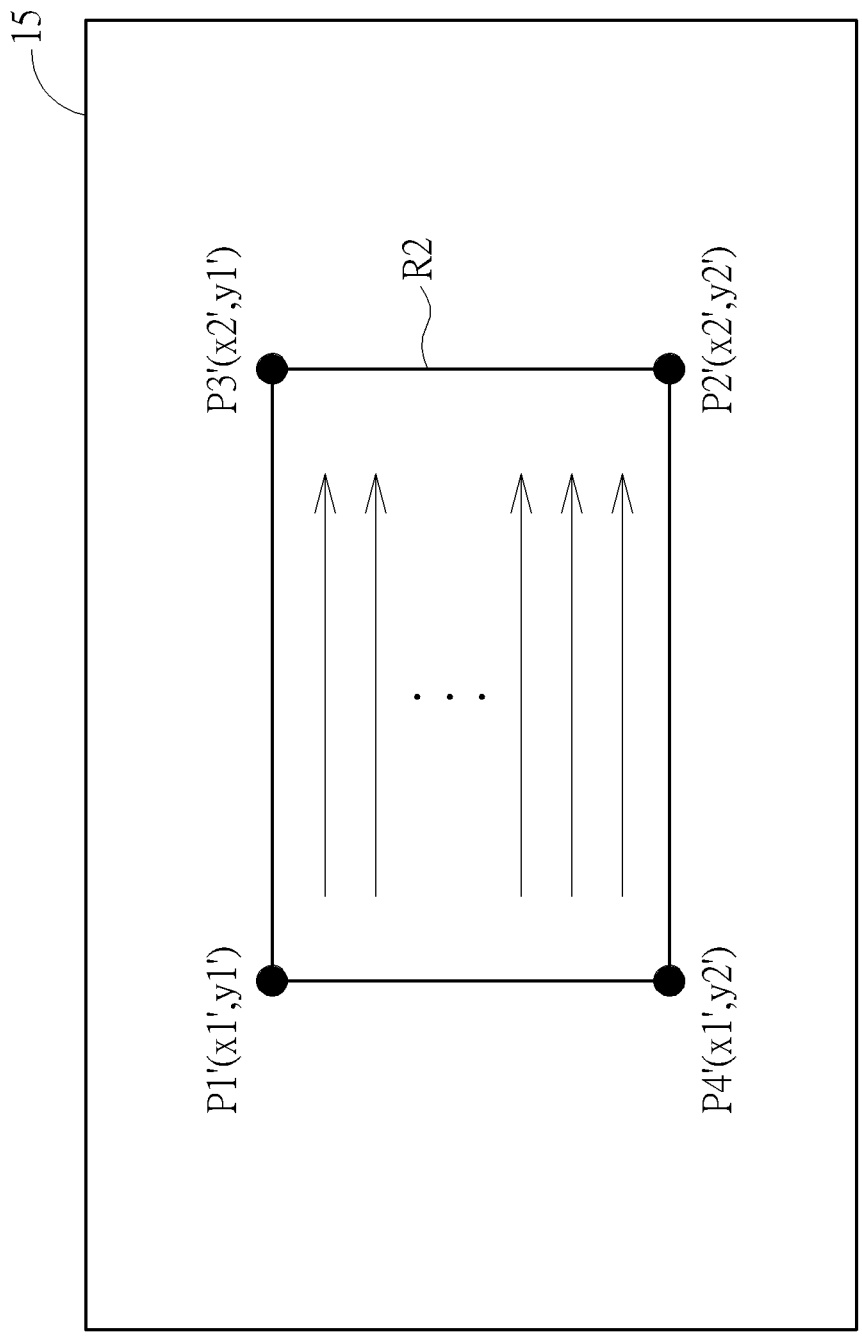
FIG. 3 is an illustration of generating a second displayed image range of the display system in FIG. 1.

FIG. 3 is an illustration of generating a second displayed image range R2 of the display system 100. As previously mentioned, the display system 100 includes the backlight driving circuit 11 for driving the plurality of backlight components of the backlight array BLA. In order to overlap the first displayed image range R1 with a backlight range surrounded by the grid lines of the backlight components, the display system 100 can adjust the first displayed image range R1 for generating the second displayed image range R2. In other words, the second displayed image range R2 can be regarded as a final range of the display panel 15 for displaying the image. However, the first displayed image range R1 can be regarded as an initial image range defined by the user. The first displayed image range R1 and the second displayed image range R2 can be substantially equal. A generation method of the second displayed image range R2 depends on some digital coordinates. For example, the chip processor 10 can generate first coordinates P1' and second coordinates P2' for displaying the image. The first coordinates P1' and the second coordinates P2' can be of diagonally opposite corners of the second displayed image range R2. The first coordinates P1' can be denoted as (x1',y1'). The second coordinates P2' can be denoted as (x2',y2'). The chip processor 10 can control the logical board 12 to drive the gate driving circuit 13 and the data driving circuit 14 according to the first coordinates P1' and the second coordinates P2'. By doing so, a plurality of pixels 16 can be driven sequentially from the first coordinates P1' to the second coordinates P2' of the second displayed image range R2. A process method can be illustrated below. Since the second displayed image range R2 can be of a rectangular shape, once two diagonally opposite corners are defined through the first coordinates P1' and the second coordinates P2', another two diagonally opposite corners can also be defined. For example, The first coordinates P1' can be denoted as (x1',y1'). The second coordinates P2' can be denoted as (x2', y2'). Therefore, third coordinates P3' can be derived as (x2',y1'). Fourth coordinates P4' can be derived as (x1', y2'). The gate driving circuit 14 and the data driving circuit 13 can drive a plurality of pixels 16 of the second displayed image range R2 surrounded by the first coordinates P1', the second coordinates P2', the third coordinates P3', and the fourth coordinates P4' for displaying the image. In the embodiment of FIG. 3, the plurality of pixels 16 of the second displayed image range R2 can be driven by enabling a pixel sub-array from a horizontal coordinate x1' to a horizontal coordinate x2' on a horizontal axis, and from a vertical coordinate y1' to a vertical coordinate y2' on a vertical axis.

As previously mentioned, the chip processor 10 can slightly adjust the first displayed image range R1 for generating the second displayed image range R2. The second displayed image range R2 can be regarded as a final range for displaying the image. Particularly, image color tones uniformity can be varied by adjusting the first displayed image range R1. However, the first displayed image range R1 and the second displayed image range R2 can be identical. When the first displayed image range R1 and the second displayed image range R2 are identical, the image color tones uniformity cannot be optimized since a distribution of backlight components is ignored. Embodiments are illustrated later. Any reasonable image color tones optimization method falls into the scope of the present invention. However, without loss of generality, the method for optimizing the image color tones uniformity by adjusting an initial image range (i.e., the first displayed image range R1) is illustrated below.

Figure 4:
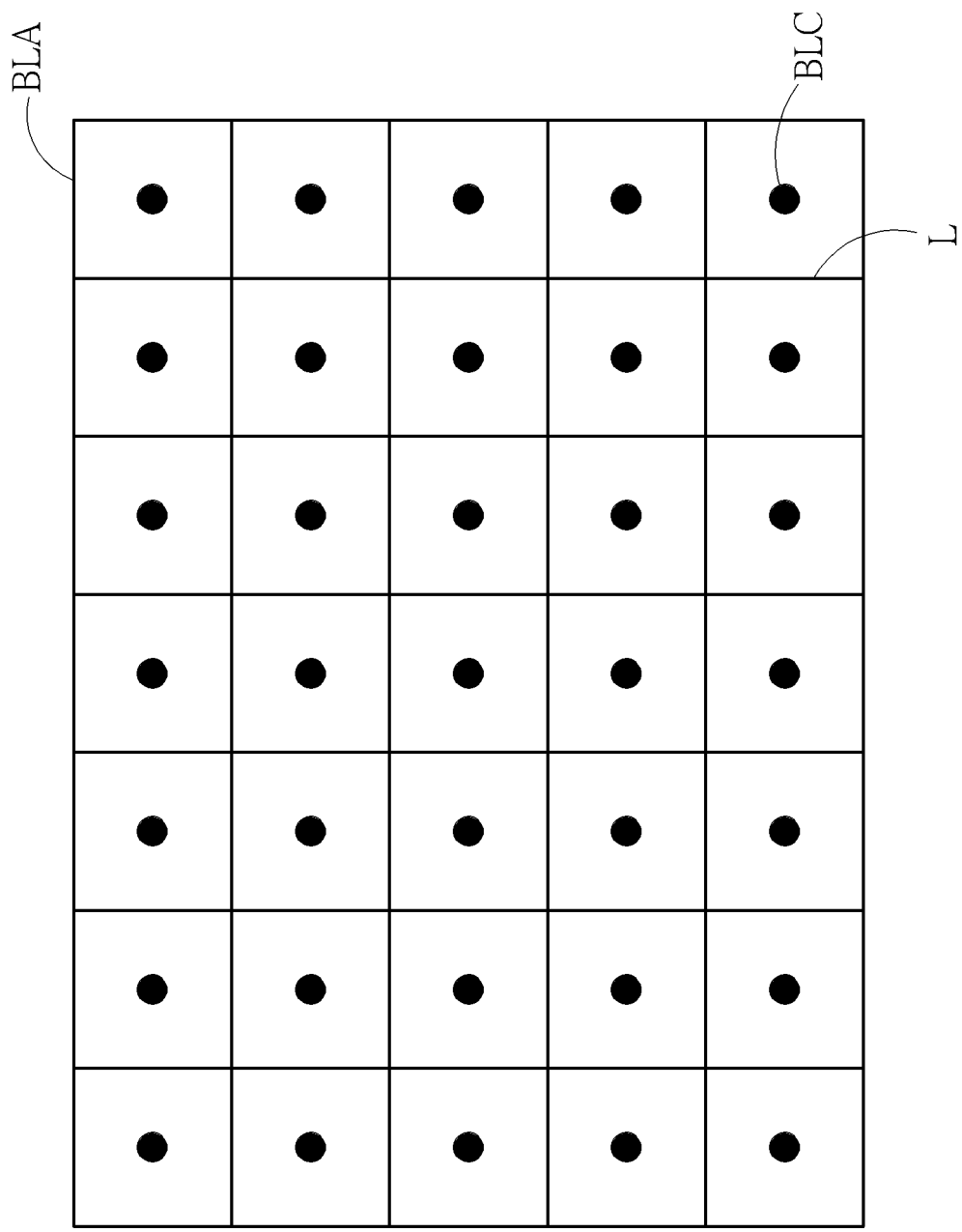
FIG. 4 is a structure of a backlight array of the display system in FIG. 1.

FIG. 4 is a structure of the backlight array BLA of the display system 100. The backlight array BLA can be driven by the backlight driving circuit 11. The backlight array BLA can include a plurality of backlight components BLC. The plurality of backlight components BLC can be any light-emitting devices, such as light-emitting diodes. Each backlight component corresponds to an illumination range. Since the plurality of backlight components BLC can be allocated in the form of an array structure, two adjacent backlight components BLC in the backlight array BLA have a corresponding grid line L.

The grid line L can be regarded as a boundary line between two illumination ranges with respect to two adjacent backlight components BLC. In other words, when the number of the backlight components BLC in the backlight array BLA is large, a distribution of the horizontal grid lines or the vertical grid lines is intensive. In the display system 100, a marginal line of the first displayed image range R1 can be shifted to a position overlapping with a grid line of the backlight array BLA closest to the marginal line. By doing so, all aliasing offsets between the second displayed image range R2 and a backlight region (i.e., a backlight sub-array) surround by grid lines can be minimized. Since the aliasing offsets are minimized, the backlight components BLC can accurately emit a backlight signal within the second displayed image range R2 for displaying the image, leading to image color tones uniformity optimization. The embodiment is illustrated below.

Figure 5:
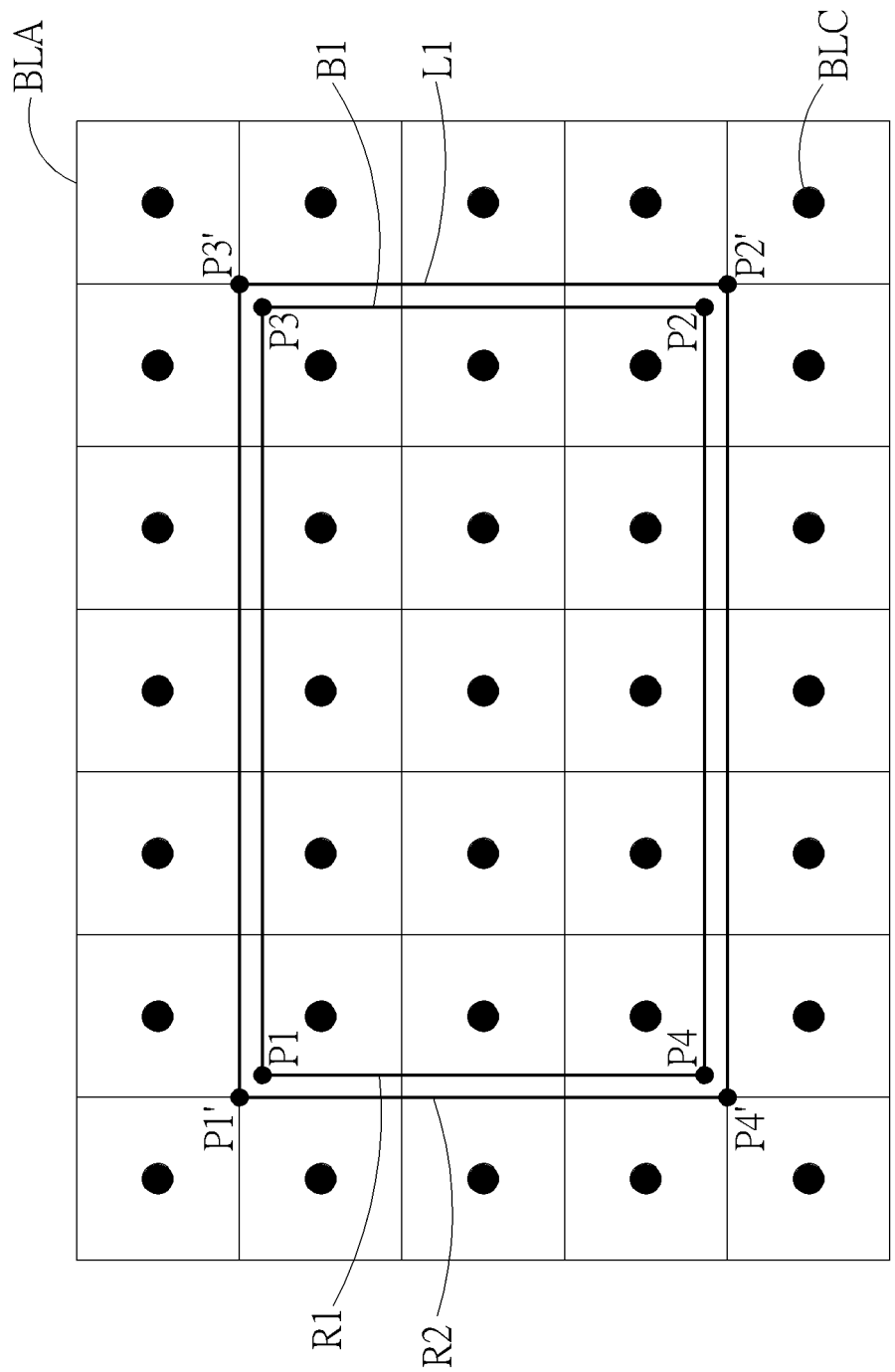
FIG. 5 is an illustration of a first mode for adjusting the first displayed image range to the second displayed image range of the display system in FIG. 1.

FIG. 5 is an illustration of a first mode for adjusting the first displayed image range R1 to the second displayed image range R2 of the display system 100. In FIG. 5, the first displayed image range R1 is initially defined by the user. After the chip processor 10 detects a plurality of grid lines corresponding to a plurality of backlight components BLC, the chip processor 10 determines that the marginal lines of the first displayed image range R1 and the grid lines of the backlight components BLC are mismatched. For example, the chip processor 10 can generate a minimum distance between a marginal line B1 of the first displayed image range R1 and a grid line L1 closest to the marginal line B1. When the minimum distance is non-zero and smaller than a predetermined value, the marginal line B1 can be shifted to a position overlapping with the grid line L1 closest to the marginal line B1. Thus, the minimum distance can be reduced by overlapping the marginal line B1 with the grid line L1. Similarly, all marginal lines of the first displayed image range R1 can be adjusted according to positions of overlapping with the corresponding grid lines of backlight components BLC. In other words, the size of the first displayed image range R1 can be enlarged slightly for generating the second displayed image range R2. Here, coordinates P1 to P4 of the first displayed image range R1 can be respectively adjusted to coordinates P1' to P4' of the second displayed image range R2. However, when the number of the backlight components BLC is large, two aspect ratios of the first displayed image range R1 and the second displayed image range R2 are almost identical. For example, the first displayed image range R1 includes 1024×768 pixels. The aspect ratio is 4:3. Further, the first displayed image range R1 can be slightly enlarged to generate the second displayed image range R2. The second displayed image range R2 can include 1080×800 pixels. The aspect ratio becomes 4:2.96. Fortunately, it is difficult for the user to notice slight variations of the aspect ratio. By doing so, after image range adjustment process is performed (i.e., also regarded as a backlight grid registration process), the displayed image within the second displayed image range R2 has optimal color tones.

Figure 6:
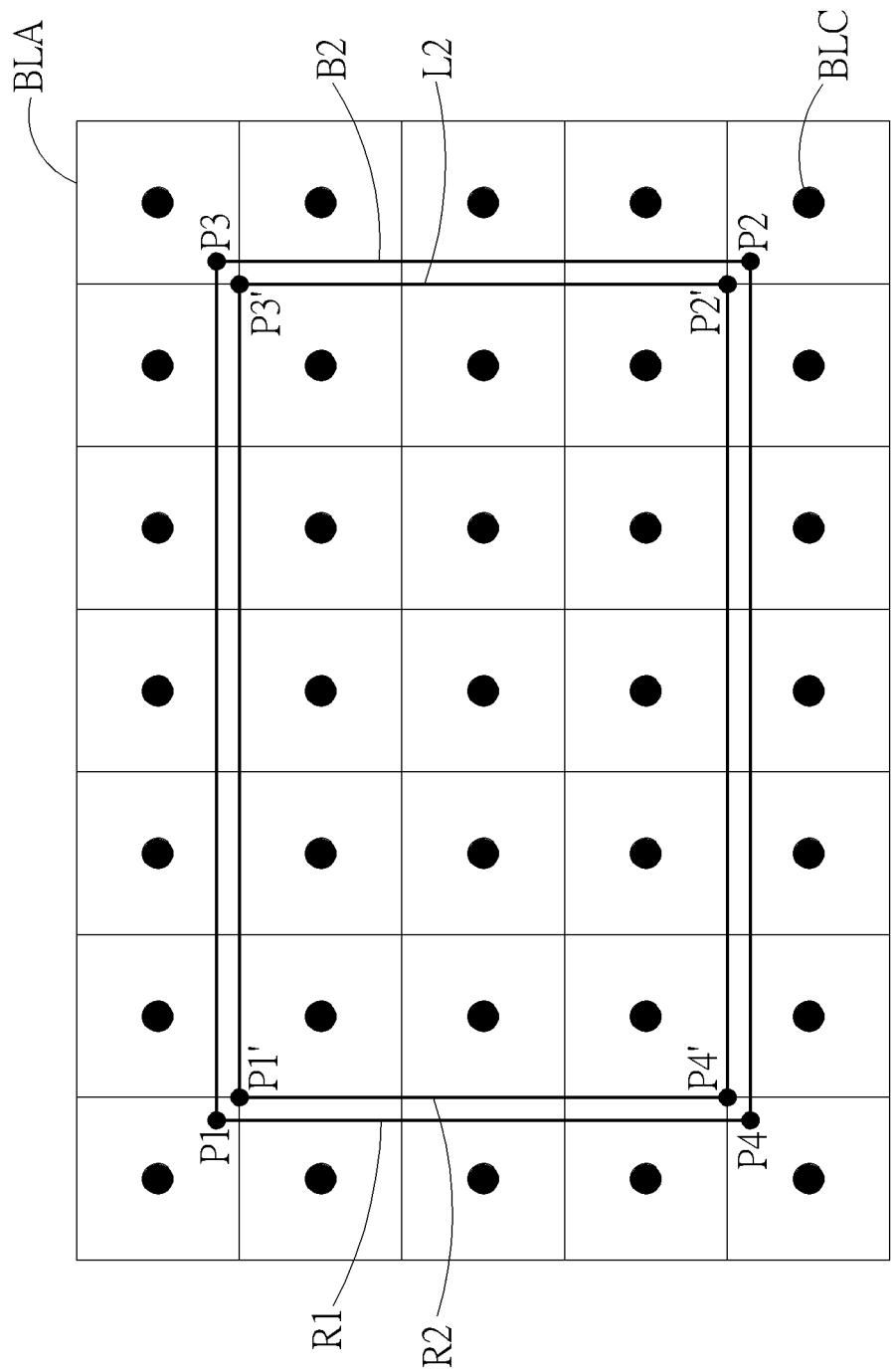
FIG. 6 is an illustration of a second mode for adjusting the first displayed image range to the second displayed image range of the display system in FIG. 1.

FIG. 6 is an illustration of a second mode for adjusting the first displayed image range R1 to the second displayed image range R2 of the display system 100. In FIG. 6, the first displayed image range R1 is initially defined by the user. After the chip processor 10 detects a plurality of grid lines corresponding to a plurality of backlight components BLC, the chip processor 10 determines that the marginal lines of the first displayed image range R1 and the grid lines of the backlight components BLC are mismatched. For example, the chip processor 10 can generate a minimum distance between a marginal line B2 of the first displayed image range R1 and a grid line L2 closest to the marginal line B2. When the minimum distance is non-zero and smaller than a predetermined value, the marginal line B2 can be shifted to a position overlapping with the grid line L2 closest to the marginal line B2. Thus, the minimum distance can be reduced by overlapping the marginal line B2 with the grid line L2. Similarly, all marginal lines of the first displayed image range R1 can be adjusted according to positions of overlapping with the corresponding grid lines of backlight components BLC. In other words, the size of the first displayed image range R1 can be reduced slightly for generating the second displayed image range R2. Here, coordinates P1 to P4 of the first displayed image range R1 can be respectively adjusted to coordinates P1' to P4' of the second displayed image range R2. However, when the number of the backlight components BLC is large, two aspect ratios of the first displayed image range R1 and the second displayed image range R2 are almost identical. For example, the first displayed image range R1 includes 1024×768 pixels. The aspect ratio is 4:3. Further, the first displayed image range R1 can be slightly reduced to generate the second displayed image range R2. The second displayed image range R2 can include 1000×720 pixels. The aspect ratio becomes 4:2.88. Fortunately, it is difficult for the user to notice slight variations of the aspect ratio. By doing so, after the image range adjustment process is performed (i.e., also regarded as a backlight grid registration process), the displayed image within the second displayed image range R2 has optimal color tones.

Two embodiments previously mentioned can optimize color tones of the displayed image in the display system 100. However, any method for optimizing the color tones of the displayed image falls into the scope of the present invention. Further, in order to avoid optical interference of the second displayed image range R2, the chip processor 10 can control the backlight driving circuit 11 for enabling a plurality of backlight components within the second displayed image range R2. At the moment, a plurality of pixels outside the second displayed image range R2 are disabled. Therefore, since the plurality of pixels outside the second displayed image range R2 are disabled by the display system 100, the user can clearly see the displayed image within the second displayed image range R2 without introducing optical interference caused by light leakage from adjacent backlight components or adjacent enabling pixels. Thus, image quality can be further improved. Further, when the minimum distance is greater than the predetermined value, it implies that a distance between a marginal line of the first displayed image range R1 and a grid line closest to the marginal line is too far. Once the first displayed image range R1 is forcibly adjusted to match a backlight range surrounded by the grid lines, severe distortion of the aspect ratio is introduced. Thus, the first displayed image range R1 is fixed. Backlight components BLC across the marginal line of the first displayed image range R1 can be enabled or disabled. When the backlight components BLC across the marginal line of the first displayed image range R1 are enabled, some highlight regions are introduced to marginal sides of the displayed image. However, the aspect ratio of the displayed image can satisfy user configurations corresponding to the first displayed image range R1. Similarly, when the backlight components BLC across the marginal line of the first displayed image range R1 are disabled, some shadow regions are introduced to marginal sides of the displayed image. However, the aspect ratio of the displayed image can satisfy user configurations corresponding to the first displayed image range R1.

Figure 7:
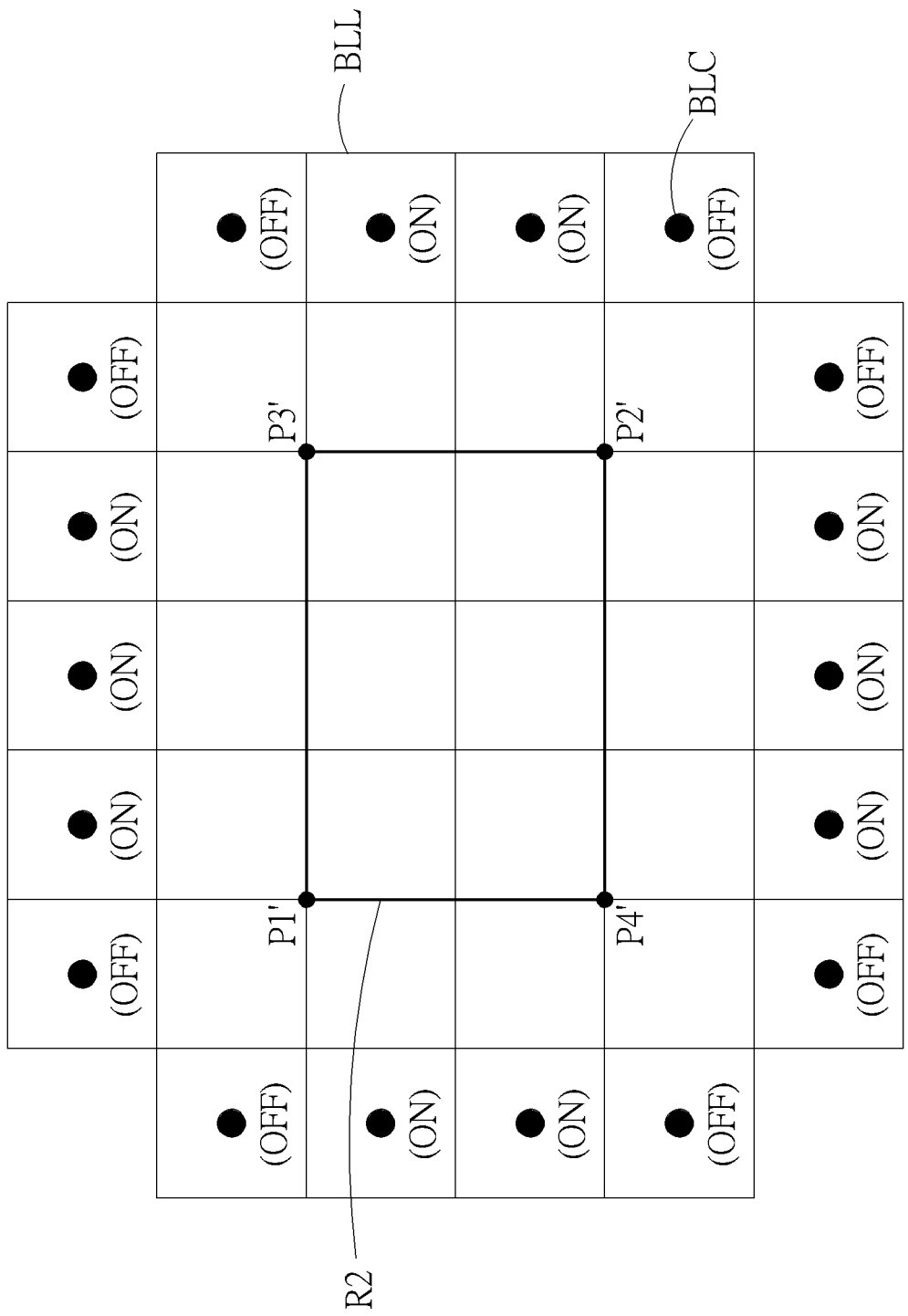
FIG. 7 is an illustration of driving an edge light-emitting diode back-lit components by a backlight driving circuit according to the second displayed image range of the display system in FIG. 1.

FIG. 7 is an illustration of driving an edge light-emitting diode back-lit components by the backlight driving circuit 11 according to the second displayed image range R2 of the display system 100. As previously mentioned, the backlight driving circuit 11 can be a direct back-lit driving circuit or an edge light-emitting diode back-lit driving circuit. For example, the embodiments in FIG. 4 to FIG. 6 can be regarded as applications of direct back-lit components (i.e., say, backlight components BLC in FIG. 4 to FIG. 6). An embodiment in FIG. 7 can be regarded as an application of the edge light-emitting diode components. In general, the direct back-lit components can be the light-emitting diodes uniformly allocated in the back of the display panel 15 (i.e., screen surface) as a light emitting source. Thus, the backlight can be uniformly transmitted to entire display panel 15. However, the edge light-emitting diode components can be the light-emitting diodes allocated around the display panel 15. Further, some light guide plates can also be introduced for transmitting the backlight from the edge sides of the display panel 15 to a center region of the display panel 15. By doing so, when the edge light-emitting diode components are enabled, the display panel 15 can receive sufficient backlight for displaying the image. In FIG. 7, the second displayed image range R2 can be regarded as a final region for displaying the image. The second displayed image range R2 can be surrounded by first coordinates P1', second coordinates P2', third coordinates P3', and fourth coordinates P4'. When the edge light-emitting diode components are introduced to the display system 100, the backlight array BLA in FIG. 4 to FIG. 6 can be replaced with a linear backlight area BLL. The linear backlight area BLL includes a plurality of backlight components BLC. The linear backlight area BLL can be allocated on an edge side of the display panel 15. In order to light the second displayed image range R2, the backlight driving circuit 11 can control an on-off state of each backlight component BLC of the linear backlight area BLL. For example, three backlight components BLC located on a middle section of an upper linear backlight area BLL corresponding to a length of the second displayed image range R2 are enabled. Two backlight components BLC at two ends of the upper linear backlight area BLL are disabled. Similarly, three backlight components BLC located on a middle section of a lower linear backlight area BLL corresponding to the length of the second displayed image range R2 are enabled. Two backlight components BLC at two ends of the lower linear backlight area BLL are disabled. Two backlight components BLC located on a middle section of a right linear backlight area BLL corresponding to a width of the second displayed image range R2 are enabled. Two backlight components BLC at two ends of the right linear backlight area BLL are disabled. Similarly, two backlight components BLC located on a middle section of a left linear backlight area BLL corresponding to the width of the second displayed image range R2 are enabled. Two backlight components BLC at two ends of the left linear backlight area BLL are disabled. However, the structure of an edge backlight source is not limited to a structure in FIG. 7. For example, the display system 100 can use a single side linear backlight area for providing the backlight. Similarly, the backlight driving circuit 11 can use a driving method for enabling or disabling some backlight components BLC allocated on the single side linear backlight area in order to provide the backlight to the second displayed image range R2.

Figure 8:
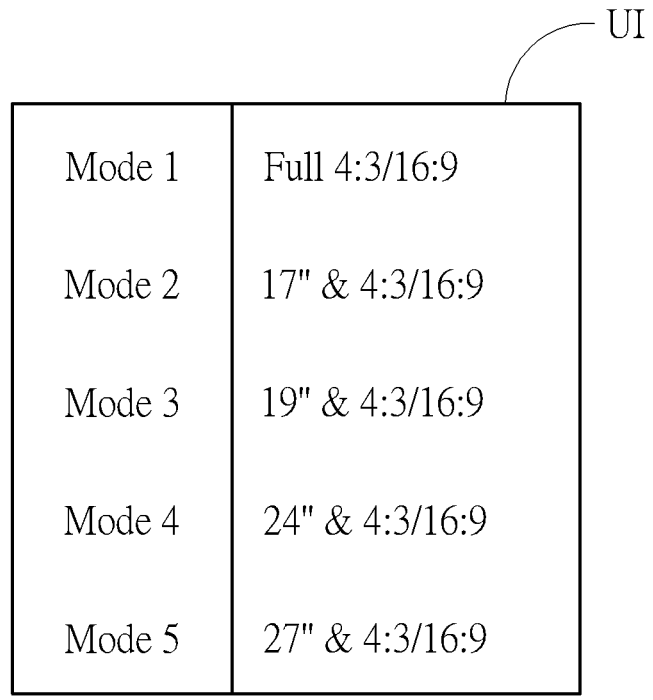
FIG. 8 is an illustration of setting the first displayed image range by using an on screen display (OSD) interface of the display system in FIG. 1.

FIG. 8 is an illustration of setting the first displayed image range R1 by using an on screen display (OSD) interface UI of the display system 100. As previously mentioned, the OSD interface UI can be used for selecting a configuration of the aspect ratio of the displayed image. Thus, the OSD interface UI can provide a plurality of supported diagonal lengths of the displayed images and a plurality of aspect ratios for each diagonal length. For example, in a first mode, an image size can be a full screen size with an optional aspect ratio of 4:3 or 16:9. In a second mode, an image size (diagonal length) can be 17 inches with an optional aspect ratio of 4:3 or 16:9. In a third mode, an image size can be 19 inches with an optional aspect ratio of 4:3 or 16:9. In a fourth mode, an image size can be 24 inches with an optional aspect ratio of 4:3 or 16:9. In a fifth mode, an image size can be 27 inches with an optional aspect ratio of 4:3 or 16:9. The user can choose one mode from the plurality of modes and further select an aspect ratio. However, the present invention is not limited to combining five modes with two aspect ratios of the OSD interface UI in FIG. 8. For example, the OSD interface UI can provide more modes and more aspect ratios for the user.

Figure 9:
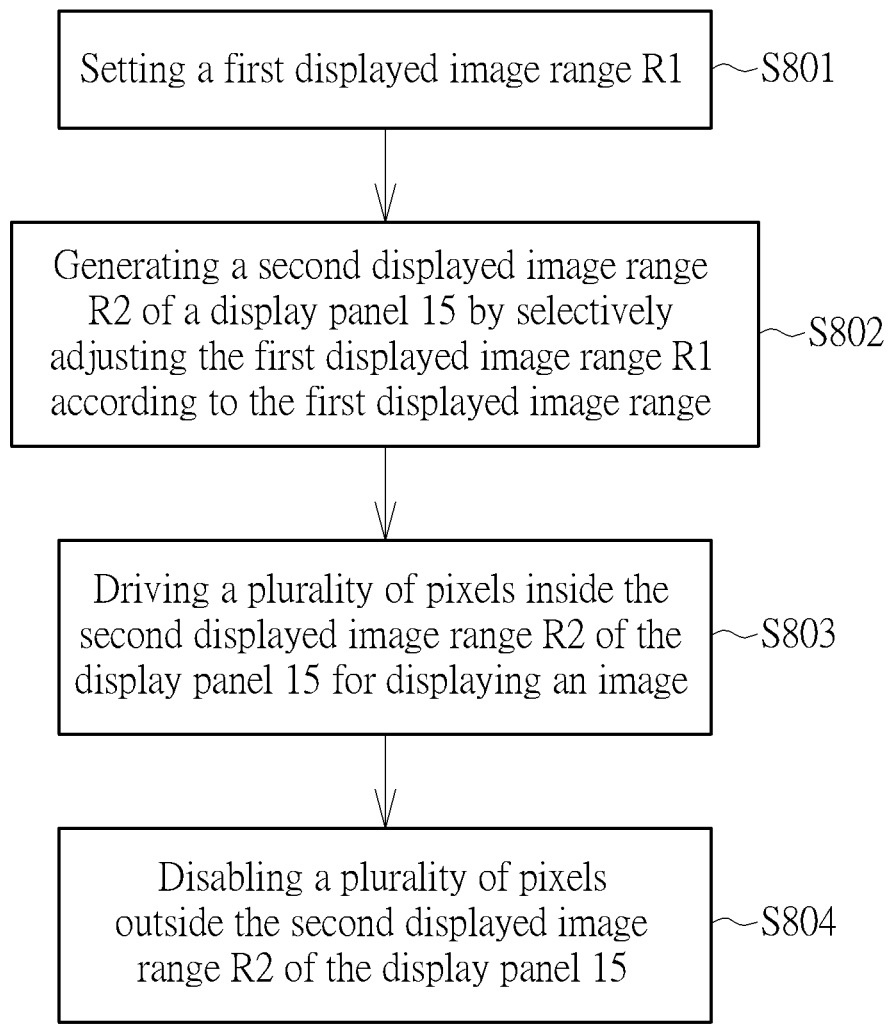
FIG. 9 is a flow chart of a method for adjusting an aspect ratio of a displayed image by using the display system in FIG. 1.

FIG. 9 is a flowchart of a method for adjusting the aspect ratio of the displayed image by using the display system 100. The method for adjusting the aspect ratio of the displayed image by using the display system 100 includes step S801 to step S804. Any reasonable step modification falls into the scope of the present invention. Step S801 to step S804 are illustrated below.

step S801: setting a first displayed image range R1;
step S802: generating a second displayed image range R2 of a display panel 15 by selectively adjusting the first displayed image range R1 according to the first displayed image range;
step S803: driving a plurality of pixels inside the second displayed image range R2 of the display panel 15 for displaying an image;
step S804: disabling a plurality of pixels outside the second displayed image range R2 of the display panel 15.

Operations of step S801 to step S804 are illustrated previously. Thus, they are omitted here. In the display system 100, the aspect ratio, size, or definition of the displayed image can be adjusted through the OSD interface UI of the display panel 15 by the user. The chip processor 10 can generate initial pixel scanning coordinates (i.e., the first coordinates P1') and terminal pixel scanning coordinates (i.e., the second coordinates P2') corresponding to the second displayed image range R2. Therefore, the display system 100 can perform an image resizing process without requiring a scalar frame buffer memory. Thus, timing delay of the video stream or the images can be avoided.

To sum up, the present invention discloses a method and a display system for adjusting an aspect ratio of a displayed image. When the display system adjusts the aspect ratio of the displayed image, the display system can generate a plurality of coordinates around an image range corresponding to an aspect ratio configured by a user. Further, pixels within the image range corresponding to the aspect ratio are driven by the gate driving circuit and the data driving circuit. Further, the display system can slightly adjust the image range for optimizing image color tones by matching the image range with a backlight range in the backlight array surrounded by grid lines. Therefore, a final range for displaying the image can satisfy the aspect ratio configured by the user and optimize image color tones. Further, instead of using a scalar frame buffer memory for performing an image resizing process, no scalar frame buffer memory is required in the display system of the present invention. Thus, timing delay of the video stream or the images can be avoided, thereby leading to visual experience improvement.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adjusting an aspect ratio of a displayed image comprising:
   setting a first displayed image range by a chip processor;
   generating a second displayed image range of a display panel by selectively adjusting an aspect ratio of the first displayed image range by the chip processor;
   generating a minimum distance between a marginal line of the first displayed image range and a grid line closest to the marginal line according to the first displayed image range by the chip processor;
   adjusting the second displayed image range by the chip processor when the minimum distance is smaller than a predetermined value to substantially overlap a marginal line of the second displayed image range with the grid line;
   controlling a gate driving circuit and a data driving circuit by a logical board for driving a plurality of pixels inside the second displayed image range of the display panel for displaying an image;
   disabling a plurality of pixels outside the second displayed image range of the display panel by the chip processor; and
   controlling a backlight driving circuit by the chip processor to drive a plurality of backlight components for emitting back light within the second displayed image range.

2. The method of claim 1, wherein the first displayed image range and the second displayed image range are substantially equal.

3. The method of claim 2, further comprising:
   generating first coordinates and second coordinates of the second displayed image range by the chip processor;
   generating third coordinates and fourth coordinates of the second displayed image range by the chip processor; and
   driving a plurality of pixels inside the second displayed image range surrounded by the first coordinates, the second coordinates, the third coordinates, and the fourth coordinates by a gate driving circuit and a data driving circuit for displaying the image;
   wherein the first coordinates and the second coordinates are two diagonally opposite corners of the second displayed image range, and the third coordinates and the fourth coordinates are another two diagonally opposite corners of the second displayed image range.

4. The method of claim 1, further comprising:
   merely enabling a plurality of backlight components within the second displayed image range by the chip processor.

5. The method of claim 1, wherein generating the second displayed image range of the display panel according to the first displayed image range is generating the second displayed image range of the display panel by selectively adjusting an aspect ratio of the first displayed image range.

6. The method of claim 5, further comprising:
   generating first coordinates and second coordinates of the second displayed image range by the chip processor;
   generating third coordinates and fourth coordinates of the second displayed image range by the chip processor; and
   driving a plurality of pixels inside the second displayed image range surrounded by the first coordinates, the second coordinates, the third coordinates, and the fourth coordinates by a gate driving circuit and a data driving circuit for displaying the image;
   wherein the first coordinates and the second coordinates are two diagonally opposite corners of the second displayed image range, and the third coordinates and the fourth coordinates are another two diagonally opposite corners of the second displayed image range.

7. The method of claim 6, further comprising:
   detecting a plurality of grid lines corresponding to a plurality of backlight components by the chip processor; and
   merely enabling a plurality of backlight components within the second displayed image range by the chip processor.

8. The method of claim 6, wherein driving the plurality of pixels inside the second displayed image range of the display panel according to the first coordinates and the second coordinates comprises:
   controlling a logical board to drive a gate driving circuit and a data driving circuit by a chip processor according to the first coordinates and second coordinates; and
   driving the plurality of pixels sequentially from the first coordinates to the second coordinates of the second displayed image range.

9. The method of claim 1, further comprising:
   adjusting timing windows of a horizontal clock signal and/or a vertical clock signal used for displaying the image in order to enable a plurality of pixels inside the second displayed image range by the chip processor; and
   disabling a plurality of pixels outside the second displayed image range by the chip processor.

10. The method of claim 1, further comprising:
adjusting the first displayed image range to the second displayed image range according to allocations of grid lines of backlight components in a backlight array driven by a backlight driving circuit by the chip processor.

11. A display system for adjusting an aspect ratio of a displayed image comprising:
a display panel comprising a plurality of pixels configured to display an image;
a gate driving circuit coupled to the plurality of pixels;
a data driving circuit coupled to the plurality of pixels;
a logical board coupled to the gate driving circuit and the data driving circuit and configured to control the gate driving circuit and the data driving circuit;
a backlight driving circuit configured to control a plurality of backlight components; and
a chip processor coupled to the logical board and the backlight driving circuit and configured to control the logical board and the backlight driving circuit;
wherein after the chip processor receives a signal corresponding to a first displayed image range, the chip processor generates a second displayed image range of a display panel according to the first displayed image range, the gate driving circuit and the data driving circuit drive a plurality of pixels inside the second displayed image range of the display panel for displaying the image, and disable a plurality of pixels outside the second displayed image range; and
wherein the second displayed image range of the display panel is generated by selectively adjusting an aspect ratio of the first displayed image range, and the chip processor generates a minimum distance between a marginal line of the first displayed image range and a grid line closest to the marginal line according to the signal corresponding to the first displayed image range, and adjusts the first displayed image range to the second displayed image range when the minimum distance is smaller than a predetermined value to substantially overlap a marginal line of the second displayed image range with the grid line.

12. The display system of claim 11, wherein the chip processor detects a plurality of grid lines corresponding to the plurality of backlight components for adjusting the first displayed image range to the second displayed image range according to allocations of the plurality of grid lines.

13. The display system of claim 11, wherein the first displayed image range and the second displayed image range are substantially equal.

14. The display system of claim 11, wherein when the chip processor generates the second displayed image range of the display panel according to the first displayed image range, the backlight driving circuit merely enables a plurality of backlight components within the second displayed image range.

15. The display system of claim 11, wherein the chip processor adjusts timing windows of a horizontal clock signal and/or a vertical clock signal used for displaying the image in order to enable a plurality of pixels inside the second displayed image range, and disables a plurality of pixels outside the second displayed image range.

16. A display system for adjusting an aspect ratio of a displayed image comprising:
a display panel comprising a plurality of pixels configured to display an image;
a gate driving circuit coupled to the plurality of pixels;
a data driving circuit coupled to the plurality of pixels;
a logical board coupled to the gate driving circuit and the data driving circuit and configured to control the gate driving circuit and the data driving circuit;
a backlight driving circuit configured to control a plurality of backlight components; and
a chip processor coupled to the logical board and the backlight driving circuit and configured to control the logical board and the backlight driving circuit;
wherein after the chip processor receives a signal corresponding to a first displayed image range, the chip processor generates a second displayed image range of a display panel according to the first displayed image range, the gate driving circuit and the data driving circuit drive a plurality of pixels inside the second displayed image range of the display panel for displaying the image, and disable a plurality of pixels outside the second displayed image range; and
wherein the chip processor generates first coordinates and second coordinates of two diagonally opposite corners of the second displayed image range, the chip processor generates third coordinates and fourth coordinates of another two diagonally opposite corners of the second displayed image range, and the gate driving circuit and the data driving circuit drive a plurality of pixels of the second displayed image range surrounded by the first coordinates, the second coordinates, the third coordinates, and the fourth coordinates for displaying the image.

17. The display system of claim 16, wherein the chip processor adjusts the first displayed image range to the second displayed image range according to allocations of grid lines of the backlight components in a backlight array driven by the backlight driving circuit.

18. The display system of claim 16, wherein the backlight driving circuit is a direct back-lit driving circuit or an edge light-emitting diode (LED) back-lit driving circuit.

* * * * *